(12) United States Patent
Tanabe et al.

(10) Patent No.: US 7,643,471 B2
(45) Date of Patent: Jan. 5, 2010

(54) MOBILE COMMUNICATION METHOD, MOBILE COMMUNICATION SYSTEM, SESSION CONTROL DEVICE AND ORIGINATING TERMINAL

(75) Inventors: Akimichi Tanabe, Yokosuka (JP); Hiroaki Amada, Yokosuka (JP); Motoshi Tamura, Yokosuka (JP); Masahiro Sawada, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 688 days.

(21) Appl. No.: 11/242,530

(22) Filed: Oct. 4, 2005

(65) Prior Publication Data

US 2006/0072609 A1    Apr. 6, 2006

(30) Foreign Application Priority Data

Oct. 5, 2004    (JP)    ............................ P2004-292989

(51) Int. Cl.
  *H04L 12/66*    (2006.01)
(52) U.S. Cl. ...................... 370/352; 370/328; 370/329; 370/331; 370/353; 370/354; 370/355; 370/356; 370/395.2; 370/400; 370/401; 370/402; 370/432
(58) Field of Classification Search .................. 370/328, 370/331, 338, 329, 352–356, 395.2, 400–402, 370/432; 455/439, 464, 450
  See application file for complete search history.

(56) References Cited

U.S. PATENT DOCUMENTS 7,170,888 B2 * 1/2007 Yoo ............................ 370/352
7,383,045 B2 * 6/2008 Tamura et al. .............. 455/433
7,508,792 B2 * 3/2009 Petrovic et al. ............. 370/331
2004/0192363 A1   9/2004 Rosetti et al.
2005/0265350 A1 * 12/2005 Narasimha et al. ........ 370/395.2
2008/0069086 A1 * 3/2008 Shin et al. .................... 370/352
2008/0101244 A1 * 5/2008 Liu et al. ..................... 370/238

FOREIGN PATENT DOCUMENTS

EP            1 463 346 A1    9/2004

OTHER PUBLICATIONS

"3rd Generation Partnership Project; Technical Specification Group Services and System Aspects; IP Multimedia Subsystem (IMS)", Stage 2 (Release 6), 3GPP TS 23.228 V6.7.0, Sep. 2004, pp. 1 to 180.

* cited by examiner

*Primary Examiner*—Aung S Moe
*Assistant Examiner*—Christopher P Grey
(74) *Attorney, Agent, or Firm*—Oblon, Spivak, McClelland, Maier & Neustadt, L.L.P.

(57) ABSTRACT

A mobile communication method for performing communications between an originating terminal and a terminating terminal through a radio access network and a core network, includes: sending a bearer setup request, in the originating terminal, to a first session control device controlling a location area of the originating terminal, the bearer setup request requesting to set a bearer for the communications between the originating terminal and the terminating terminal; and performing a process of sending a communication start request for the terminating terminal in response to the bearer setup request in parallel with a process of commanding a bearer setup device to set the bearer, in the first session control device.

9 Claims, 10 Drawing Sheets

MOBILE COMMUNICATION METHOD, MOBILE COMMUNICATION SYSTEM, SESSION CONTROL DEVICE AND ORIGINATING TERMINAL

CROSS REFERENCE TO RELATED APPLICATION

This application is based upon and claims the benefit of priority from the prior Japanese Patent Application No. P2004-292989, filed on Oct. 5, 2004; the entire contents of which are incorporated herein by reference.

BACKGROUND OF THE INVENTION

1. Field of the Invention

The present invention relates to a mobile communication method and a mobile communication system, which perform communications between an originating terminal and a terminating terminal through a radio access network and a core network, and to a session control device and an originating terminal, which are used in the mobile communication method.

2. Description of the Related Art

Figure 1:
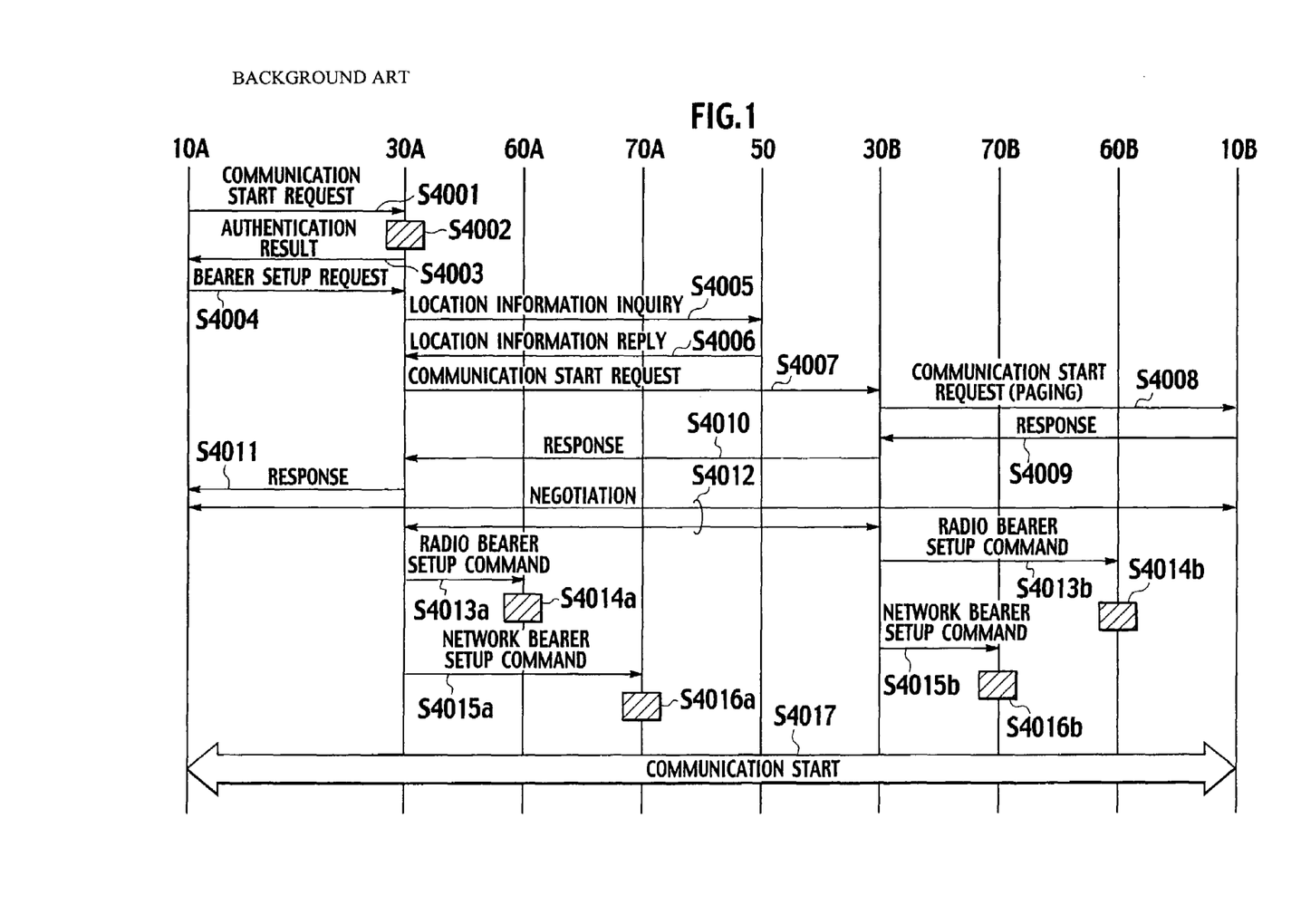
FIG. 1 is a sequence chart showing a conventional mobile communication method.
Figure 2:
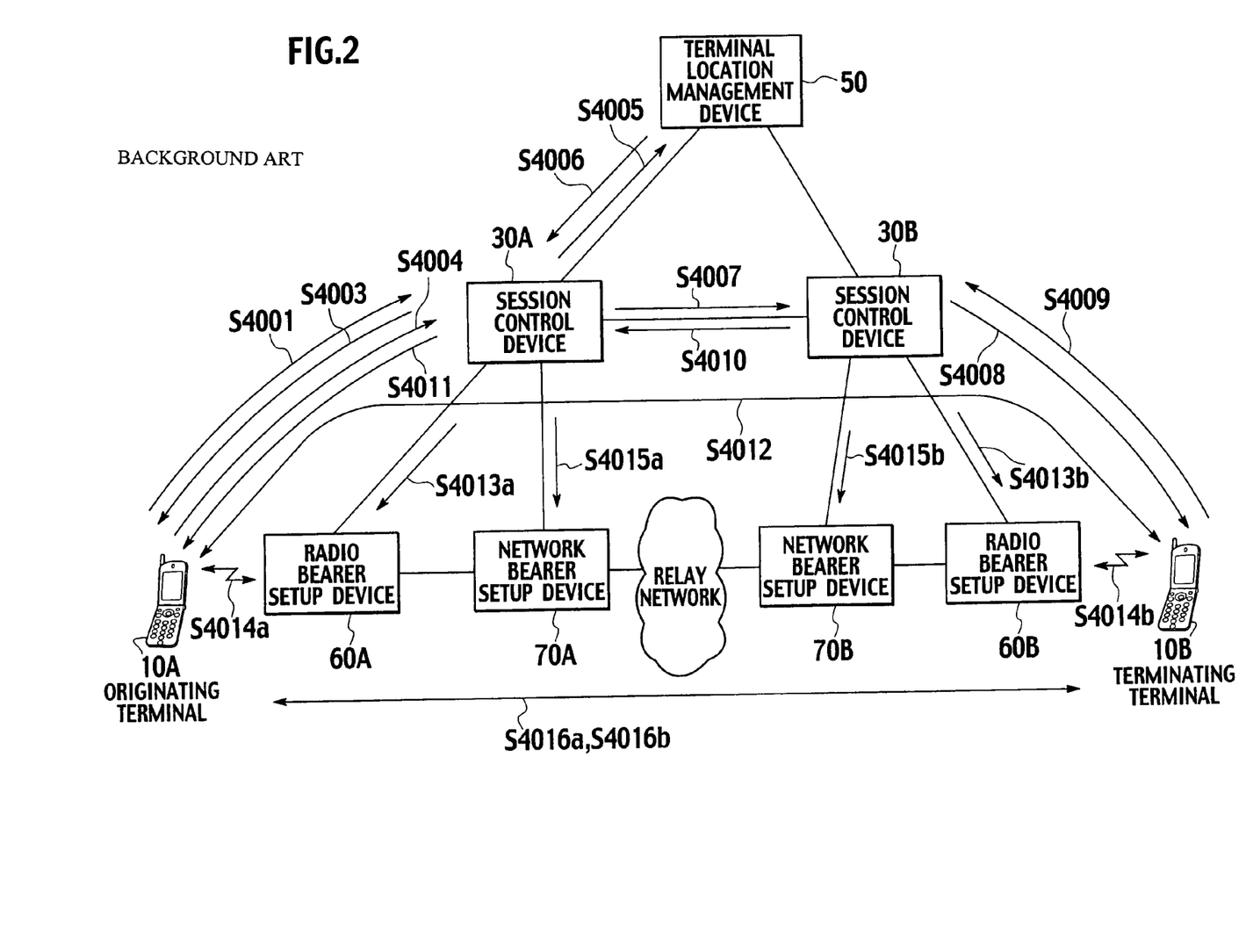
FIG. 2 is a view showing a flow of the conventional mobile communication method.

With reference to FIGS. 1 and 2, descriptions will be given of a conventional mobile communication method of performing communications between an originating terminal and a terminating terminal through a radio access network and a core network.

In Step S4001, an originating terminal 10A sends a communication start request (a call request) which requests to start communications with a terminating terminal 10B, to a session control device 30A controlling a location area of the originating terminal 10A.

In Step S4002, the session control device 30A performs an authentication process for the originating terminal 10A in response to the received communication start request, and then in Step S4003, the result of the authentication is sent to the originating terminal 10A.

In Step S4004, when the result of authentication is affirmative, the originating terminal 10A sends a bearer setup request (a U-plane bearer setup request) which requests to set a bearer for communications between the originating terminal 10A and the terminating terminal 10B, to the session control device 30A.

In Step S4005, the session control device 30A inquires of a terminal location management device 50 about a location area of the terminating terminal 10B (location information).

In Step S4006, the session control device 30A obtains the location area of the terminating terminal 10B from the terminal location management device 50.

In Step S4007, the session control device 30A sends a communication start request for the terminating terminal 10B to a session control device 30B controlling the obtained location area of the terminating terminal 10B.

In Step S4008, the session control device 30B sends a communication start request (a calling signal, paging) for the terminating terminal 10B.

In Step S4009, the terminating terminal 10B sends a response to the received communication start request to the session control device 30B.

In Step S4010, the session control device 30B transfers the received response to the session control device 30A, and in Step S4011, the session control device 30A transfers the received response to the originating terminal 10A.

In Step S4012, communication conditions including a communication quality, a communication speed and the like are negotiated between the originating terminal 10A, which has received the above-mentioned response, and the terminating terminal 10B, and between the session control device 30A and the session control device 30B.

In Step S4013$a$, the session control device 30A sends to a radio bearer setup device 60A a radio bearer setup command which commands to set a radio bearer in a radio access network, in response to the above-mentioned negotiation result.

In Step S4014$a$, the radio bearer setup device 60A sets a radio bearer between the radio bearer setup device 60A and the originating terminal 10A in the radio access network.

Moreover, in Step S4015$a$, the session control device 30A sends to a network bearer setup device 70A a network bearer setup command which commands to set a network bearer in a core network, in response to the above-mentioned negotiation result.

In Step S4016$a$, the network bearer setup device 70A sets the network bearer in the core network used for communications between the originating terminal 10A and the terminating terminal 10B.

Similarly, in Step S4013$b$, the session control device 30B sends to a radio bearer setup device 60B a radio bearer setup command which commands to set a radio bearer in the radio access network, in response to the above-mentioned negotiation result.

In Step S4014$b$, a radio bearer in the radio access network between the radio bearer setup device 60B and the terminating terminal 10B is set.

Furthermore, in Step S4015$b$, the session control device 30B sends to a network bearer setup device 70B a network bearer setup command which commands to set a network bearer in the core network, in response to the above-mentioned negotiation result.

In Step S4016$b$, the network bearer setup device 70B sets the network bearer in the core network used for communications between the originating terminal 10A and the terminating terminal 10B.

In Step S4017, the originating terminal 10A starts communications with the terminating terminal 10B by use of the set radio and network bearers.

In the conventional mobile communication method, when the originating terminal 10B is out of the coverage area or is during communication, it is configured that network resources (especially the radio bearer on the originating terminal 10A side) is not used wastefully.

However, in the conventional mobile communication method, as described above, it is required to sequentially perform steps necessary to start communications between the originating terminal 10A and the terminating terminal 10B.

Therefore, there has been a problem in that connection delay, which is the time from the sending of a call request to the time the communication is started, is long.

BRIEF SUMMARY OF THE INVENTION

The present invention has been made considering the problems, and its object is to provide a mobile communication method, a mobile communication system, a session control device and an originating terminal, which can shorten the connection delay in starting communications between the originating terminal and the terminating terminal through a radio access network and a core network.

A first aspect of the present invention is summarized as a mobile communication method for performing communications between an originating terminal and a terminating terminal through a radio access network and a core network. The method includes: sending a bearer setup request, in the originating terminal, to a first session control device controlling a location area of the originating terminal, the bearer setup request requesting to set a bearer for the communications between the originating terminal and the terminating terminal; and performing a process of sending a communication start request for the terminating terminal in response to the bearer setup request in parallel with a process of commanding a bearer setup device to set the bearer, in the first session control device.

In the first aspect, in the performing step, the first session control device may perform a process of sending the communication start request for a second session control device controlling a location area of the terminating terminal in parallel with a process of commanding the bearer setup devices to set the bearer.

In the first aspect, in the performing step, the second session control device may perform a process of sending the communication start request for the terminating terminal in parallel with a process of commanding the bearer setup device to set the bearer.

In the first aspect, in the process of commanding, the first session control device may perform a process of commanding a bearer setup device for the radio access network to set a radio bearer in the radio access network in parallel with a process of commanding a bearer setup device for the core network to set a network bearer in the core network.

In the first aspect, in the process of commanding, the second session control device may command a bearer setup device for the core network to set a network bearer in the core network; and the method may further includes: performing a process of transferring a response to the first session control device in parallel with a process of commanding a bearer setup device for the radio access network to set a radio bearer in the radio access network, when the second session control device receives the response to the communication start request sent from the terminating terminal.

In the first aspect, the method may further includes: setting the bearer in response to the bearer setup request, in a bearer setup device for the radio access network and a bearer setup device for the core network; negotiating about a communication condition between the originating terminal and the terminating terminal; and resetting the bearer in response to the negotiation result.

In the first aspect, in the sending step, the originating terminal may send the bearer setup request in parallel with the communication start request for the terminating terminal, to the first session control device; and in the negotiating step, the originating terminal may negotiate with the terminating terminal about the communication condition, when receiving a response to the communication start request sent from the terminating terminal.

A second aspect of the present invention is summarized as a mobile communication system which performs communications between an originating terminal and a terminating terminal through a radio access network and a core network. In the system, the originating terminal is configured to request a first session control device controlling a location area of the originating terminal to set a bearer for the communications between the originating and terminating terminals; and the first session control device is configured to perform a process of sending a communication start request for the terminating terminal in parallel with a process of commanding a bearer setup device to set the bearer.

A third aspect of the present invention is summarized as a session control device which performs communications between an originating terminal and a terminating terminal through a radio access network and a core network. The device includes: a transmission unit configured to send a communication start request for the terminating terminal in parallel with a bearer setup command to command a bearer setup device to set a bearer for the communications between the originating terminal and the terminating terminal in response to a communication start request sent from the originating terminal.

A fourth aspect of the present invention is summarized as a session control device which performs communications between an originating terminal and a terminating terminal through a radio access network and a core network. The device includes: a first transmission unit configured to send a communication start request for the terminating terminal in parallel with a bearer setup command to command a bearer setup device for the core network to set a network bearer in the core network for the communications between the originating terminal and the terminating terminal, in response to a communication start request sent from a first session control device controlling a location area of the originating terminal; and a second transmission unit configured to perform a process of transferring the response to the first session control device in parallel with a process of commanding a bearer setup device for the radio access network to set a radio bearer in the radio access network, when receiving a response to the communication start request sent from the terminating terminal.

A fifth aspect of the present invention is summarized as an originating terminal which performs communications with a terminating terminal through a radio access network and a core network. The terminal includes: a transmission unit configured to send a communication start request for the terminating terminal in parallel with a bearer setup request to a first session control device controlling a location area of the originating terminal, the bearer setup request requesting to set a bearer for the communications between the originating terminal and the terminating terminal; a negotiation unit configured to negotiate about a communication condition with the terminating terminal in response to the communication start request sent from the terminating terminal; and a communication unit configured to perform the communications with the terminating terminal by use of the bearer set based on the negotiation result.

DETAILED DESCRIPTION OF THE INVENTION

Configuration of a Mobile Communication System According to a First Embodiment of Present Invention With reference to FIGS. 3 to 5, descriptions will be given of a configuration of a mobile communication system according to a first embodiment of the present invention.

The mobile communication system according to this embodiment is a system which performs communications between an originating terminal and a terminating terminal through a radio access network and a core network.

Figure 3:
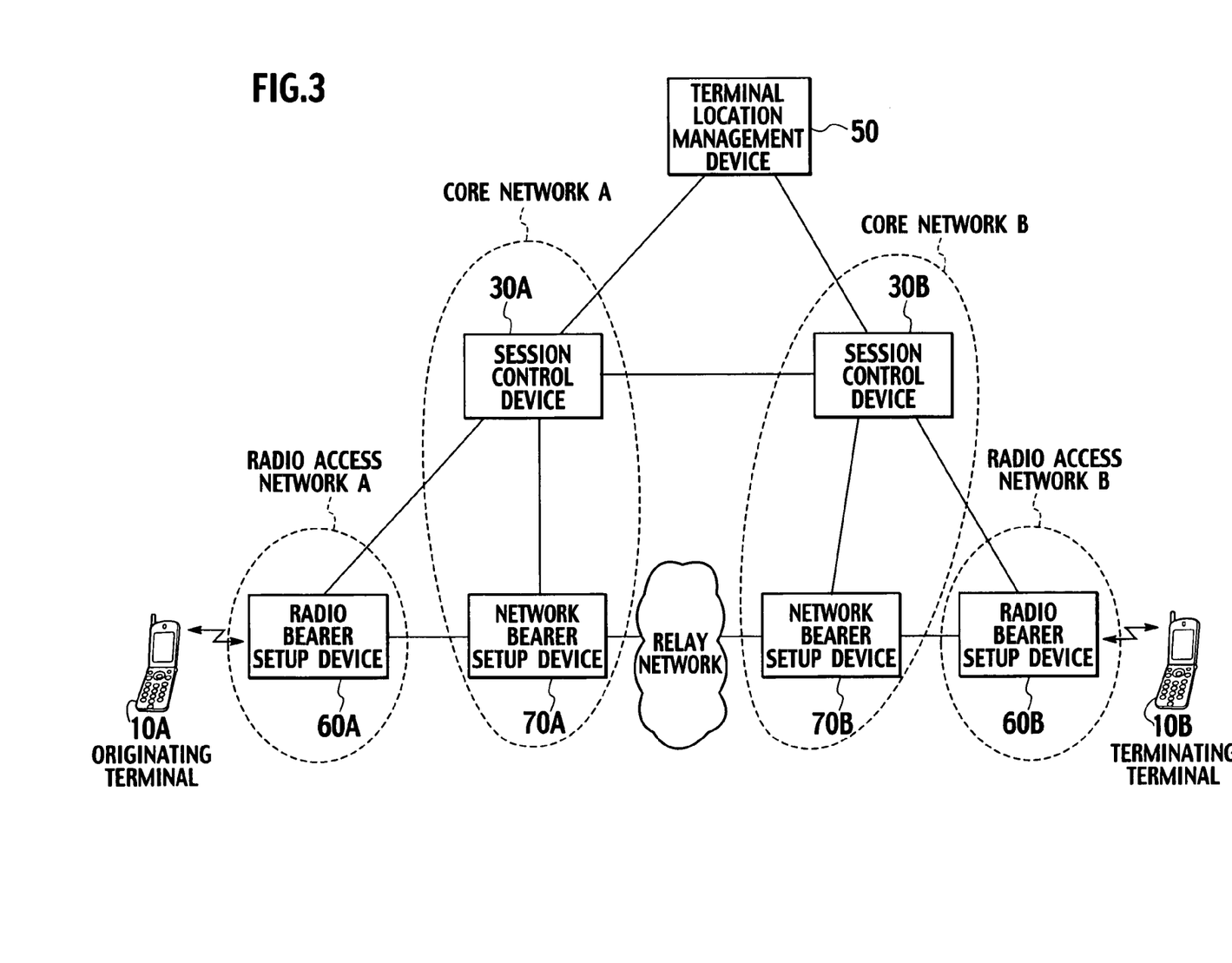
FIG. 3 is an entire configuration diagram of a mobile communication system according to first to third embodiments of the present invention.

FIG. 3 shows an entire configuration of the mobile communication system according to this embodiment.

As shown in FIG. 3, the mobile communication system according to this embodiment includes an originating terminal 10A, a terminating terminal 10B, session control devices 30A and 30B, a terminal location management device 50, radio bearer setup devices 60A and 60B, and network bearer setup devices 70A and 70B.

For example, the radio bearer setup device 60A is provided in a radio network controller (RNC) in a radio access network A, and the radio bearer setup device 60B is provided in a radio network controller in a radio access network B.

Furthermore, the session control device 30A and the network bearer setup device 70A are provided in a switching node (MSC/GMSC: Mobile Switching Center/Gateway MSC or PDSN/PDGN: Packet Data Serving Node/Packet Data Gateway Node) in a core network A.

The session control device 30B and the network bearer setup device 70B are provided in the switching node (MSC/GMSC or PDSN/PDGN) in a core network B.

Note that the session control devices 30A and 30B may be provided in a call state control function (CSCF).

Moreover, the network bearer setup devices 70A and 70B may be provided in a media gateway MGW, a serving GPRS support node (SGSN) or a gateway GPRS support node (GGSN).

In addition, the terminal location control device 50 is provided in a location information registration device (HLR: Home Location Register, VLR/GLR: Visitor/Gateway Location Register).

Note that the core networks A and B are connected through a relay network.

Figure 4:
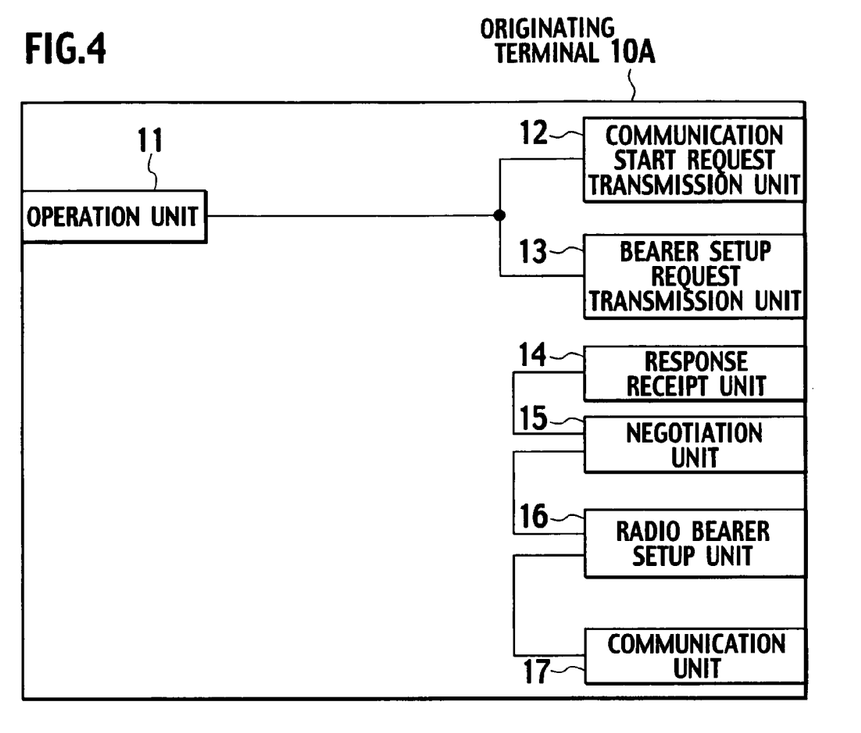
FIG. 4 is a functional block diagram of an originating terminal in the mobile communication system according to the first embodiment of the present invention.

As shown in FIG. 4, the originating terminal 10A, which is used in the mobile communication system according to this embodiment, includes an operation unit 11, a communication start request transmission unit 12, a bearer setup request transmission unit 13, a response receipt unit 14, a negotiation unit 15, a radio bearer setup unit 16 and a communication unit 17.

The operation unit 11 is used for allowing a user of the originating terminal 10A to perform an operation of starting communications with the terminating terminal 10B. For example, the operation unit 11 is configured by push buttons and the like.

The communication start request transmission unit 12 is configured to send a communication start request (a call request) for the terminating terminal 10B, to the first session control unit 30A controlling a location area of the originating terminal 10A, in response to the operation of starting communications by the user of the originating terminal 10A. Here, the authentication data of the originating terminal 10A is included in the communication start request.

The bearer setup request transmission unit 13 is configured to send a bearer setup request (a U-plane bearer setup request) which requests to set bearers (a radio bearer and a network bearer) for communications between the originating terminal 10A and the terminating terminal 10B, to the first session control device 30A.

Here, the bearer setup request includes the information on a communication party (the terminating terminal 10B), the condition of a U-plane bearer used for communications desired by the originating terminal 10A, and the like.

When a starting communication operation is performed by the user of the originating terminal 10A, a process of sending the communication start request by the communication start request transmission unit 12 is performed in parallel with a process of sending the bearer setup request by the bearer setup request transmission unit 13.

The response receipt unit 14 is configured to receive a response to the communication start request for the terminating terminal 10B, and to notify the negotiation unit 15 of that effect.

The negotiation unit 15 is configured to negotiate about communication conditions on a communication quality, a communication speed and the like with the terminating terminal 10B, in response to the notification from the response receipt unit 14.

The radio bearer setup unit 16 is configured to set the radio bearer in the radio access network in cooperation with the radio bearer setup device 60A.

The communication unit 17 is configured to communicate with the terminating terminal 10B by use of the radio bearer and the network bearer set based on a result of the negotiation by the negotiation unit 15.

Figure 5:
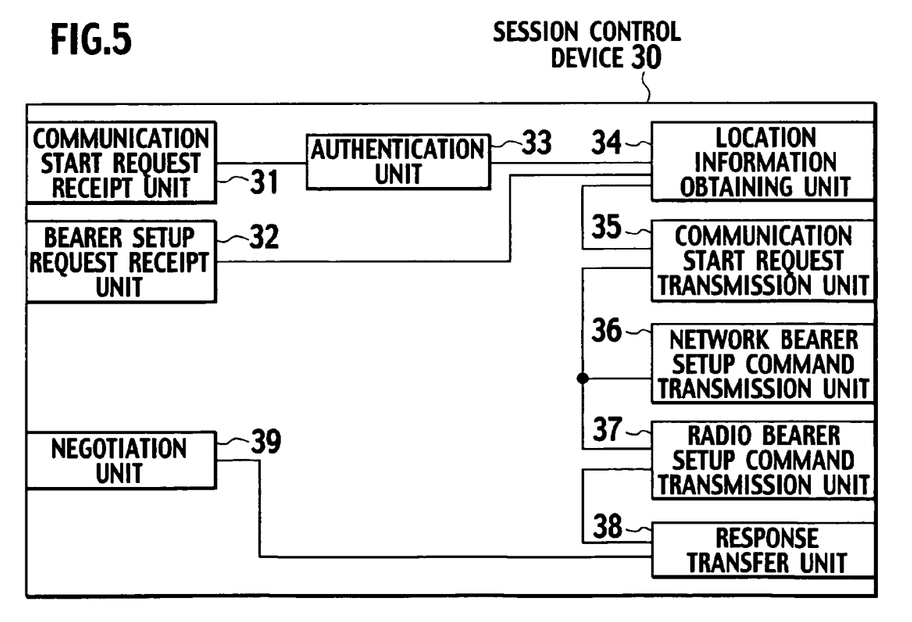
FIG. 5 is a functional block diagram of a session control device in the mobile communication system according to the first embodiment of the present invention.

As shown in FIG. 5, a session control device 30 used in the mobile communication system according to this embodiment includes a communication start request receipt unit 31, a bearer setup command receipt unit 32, a authentication unit 33, a location information obtaining unit 34, a communication start request transmission unit 35, a network bearer setup command transmission unit 36, a radio bearer setup command unit 37, a response transfer unit 38 and a negotiation unit 39.

The communication start request receipt unit 31 is configured to receive the communication start request (the call request) sent from the originating terminal 10A.

The bearer setup command receipt unit 32 is configured to receive a bearer setup command sent from the originating terminal 10A.

The authentication unit 33 is configured to perform an authentication process for the originating terminal 10A by use of authentication data included in the communication start request received by the communication start request receipt unit 31.

The location information obtaining unit 34 is configured to obtain the location information of the communication party (a location area of the party) from the terminal location management device 50, based on the information on the communication party included in the bearer setup command received by the bearer setup command receipt unit 32, when the authentication result by the authentication unit 33 is affirmative.

The communication start request transmission unit 35 is configured to send the communication start request for the terminating terminal 10B, to the session control device 30 controlling the location area of the communication party. Here, the location area of the communication party is obtained by the location information obtaining unit 34.

Furthermore, the communication start request transmission unit 35 is configured to send a communication start request (a calling signal or paging) for the terminating terminal 10B, when receiving the communication start request for the terminating terminal 10B which is in the area controlled by the session control device 30 itself, from another session control device 30 (for example, the first session control device 30A controlling the location area of the originating terminal 10A).

The network bearer setup command transmission unit 36 is configured to command a network bearer setup device 70 (a bearer setup device for the core network) to set a network bearer in the core network for communications between the originating terminal 10A and the terminating terminal 10B.

The radio bearer setup command transmission unit 37 is configured to command a radio bearer setup device 60 (a bearer setup device for the radio access network) to set a radio bearer in the radio access network for communications between the originating terminal 10A and terminating terminal 10B.

The response transfer unit 38 is configured to receive a response to the communication start request (paging) sent from the terminating terminal 10B, and to transfer the received response to the first session control device 30A controlling the location area of the originating terminal 10A, or to the originating terminal 10A.

The negotiation unit 39 is configured to negotiate the communication conditions including the communication quality, the communication speed and the like with the session control device 30 controlling the location area of the terminating terminal 10B (or the originating terminal 10A), and to negotiate the communication conditions between the originating terminal 10A and the terminating terminal 10B, simultaneously (or in parallel).

When the session control device 30 obtains the location information of the terminating terminal 10B from the terminal location management device 50, a process of sending the transmission start request by the communication start request transmission unit 35 is performed in parallel with a process of sending the network bearer setup command by the network bearer setup command transmission unit 36; and a process of sending the radio bearer setup command by the radio bearer setup command transmission unit 37.

Moreover, when the session control device 30 receives the communication start request for the terminating terminal 10B from the session control device 30A controlling the location area of the originating terminal 10A, a process of sending the communication start request (paging) by the communication start request transmission unit 35 is performed in parallel with a process of sending the network bearer setup command by the network bearer setup command transmission unit 36.

Additionally, when the session control device 30 receives the response to the communication start request sent from the terminating terminal 10B, a process of sending the radio bearer setup command by the radio bearer setup command transmission unit 37 is performed of transferring the response from the response transfer unit 38.

(Operations of the Mobile Communication System According to the First Embodiment of the Present Invention)

Figure 6:
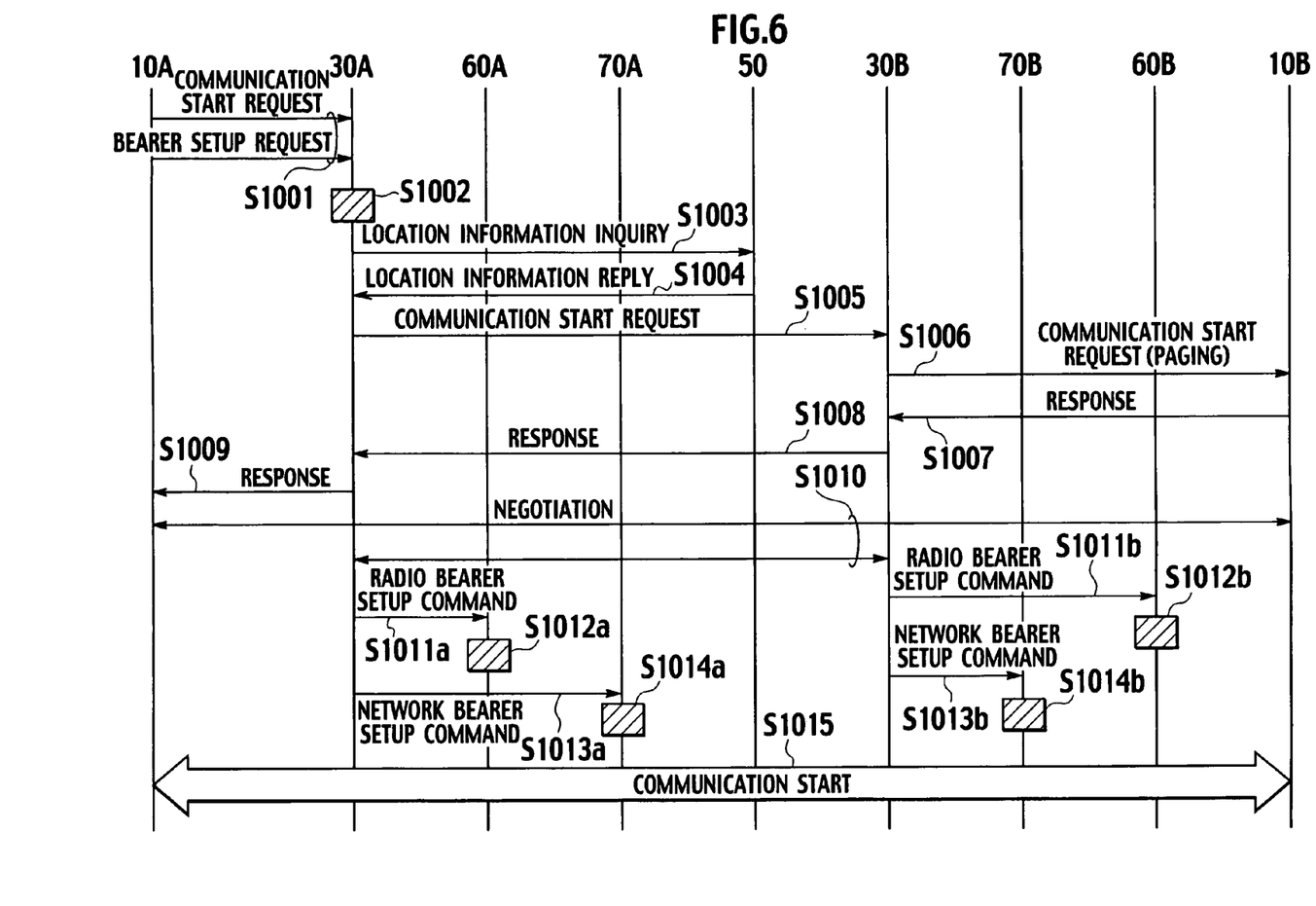
FIG. 6 is a sequence chart showing a mobile communication method according to the first embodiment of the present invention.
Figure 7:
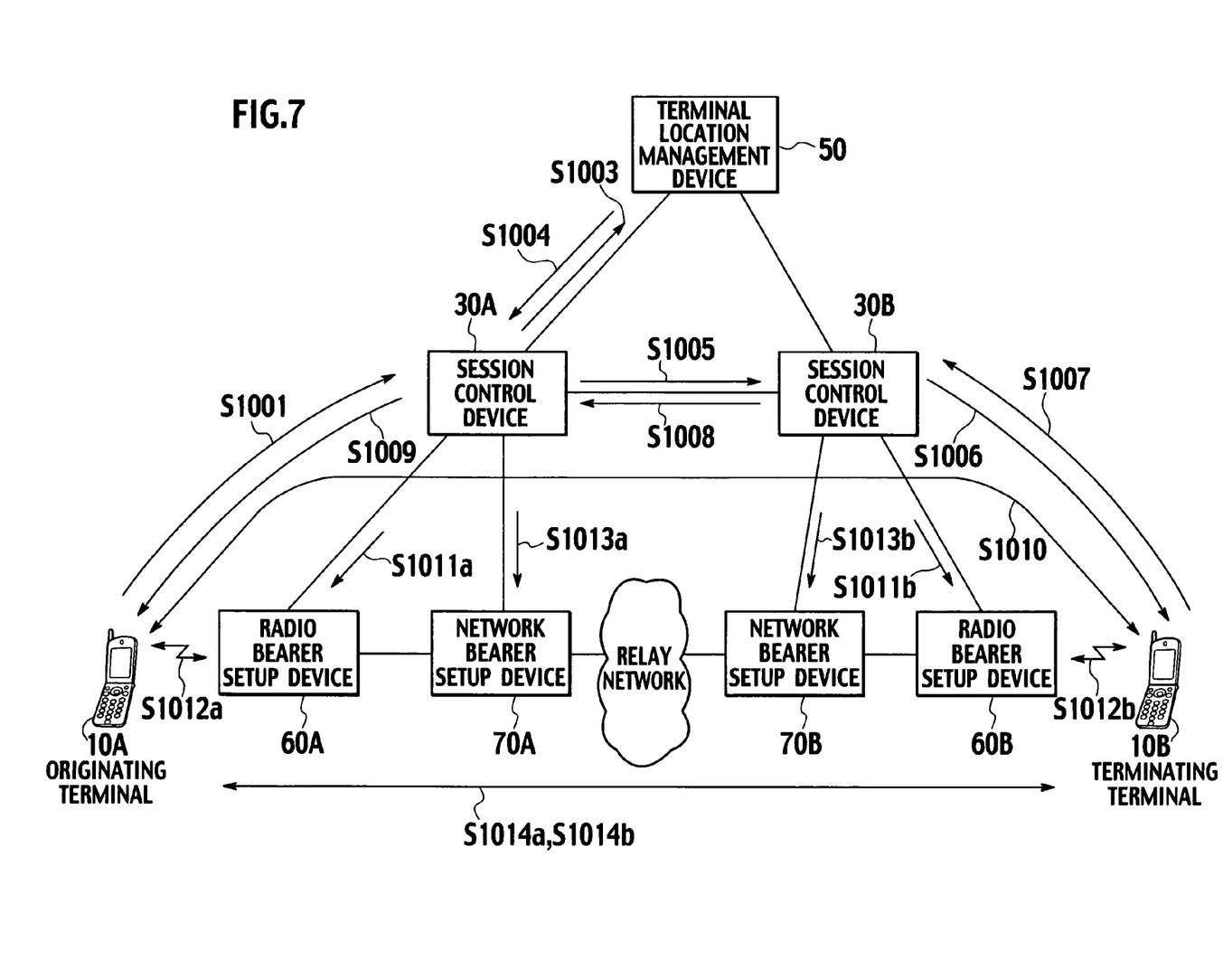
FIG. 7 is a view showing a flow of the mobile communication method according to the first embodiment of the present invention.

With reference to FIGS. 6 and 7, descriptions will be given of the operations of the mobile communication system according to the first embodiment of the present invention.

In Step S1001, the originating terminal 10A sends to the session control device 30A controlling the location area of the originating terminal 10A the communication start request (the call request) which requests to start communications with the terminating terminal 10B, in parallel with the bearer setup request (the U-plane bearer setup request) which requests to set the bearer for communications between the originating terminal 10A and the terminating terminal 10B.

In Step S1002, the session control device 30A performs the authentication process for the originating terminal 10A in response to the received communication start request.

When the authentication result is affirmative, the session control device 30A makes an inquiry to the terminal location management device 50 about the location area of the terminating terminal 10B (the location information) in Step S1003, and obtains the location area of the terminating terminal 10B from the terminal location management device 50 in Step S1004.

Hereinafter, since the operations from Steps S1005 to S1015 are the same as those from Steps S4007 to S4017 in FIG. 1, descriptions will be omitted.

(Actions and Effects of the Mobile Communication System According to the First Embodiment of the Present Invention)

With the mobile communication system according to the first embodiment of the present invention, the originating terminal 10A sends the communication start request and the bearer setup command simultaneously.

Therefore, the originating terminal 10A can shorten the connection delay compared with the conventional mobile communication system configured to send a bearer setup command again after the originating terminal 10A receives the authentication result by the session control device 30A.

(Mobile Communication System According to a Second Embodiment of the Present Invention)

Figure 8:
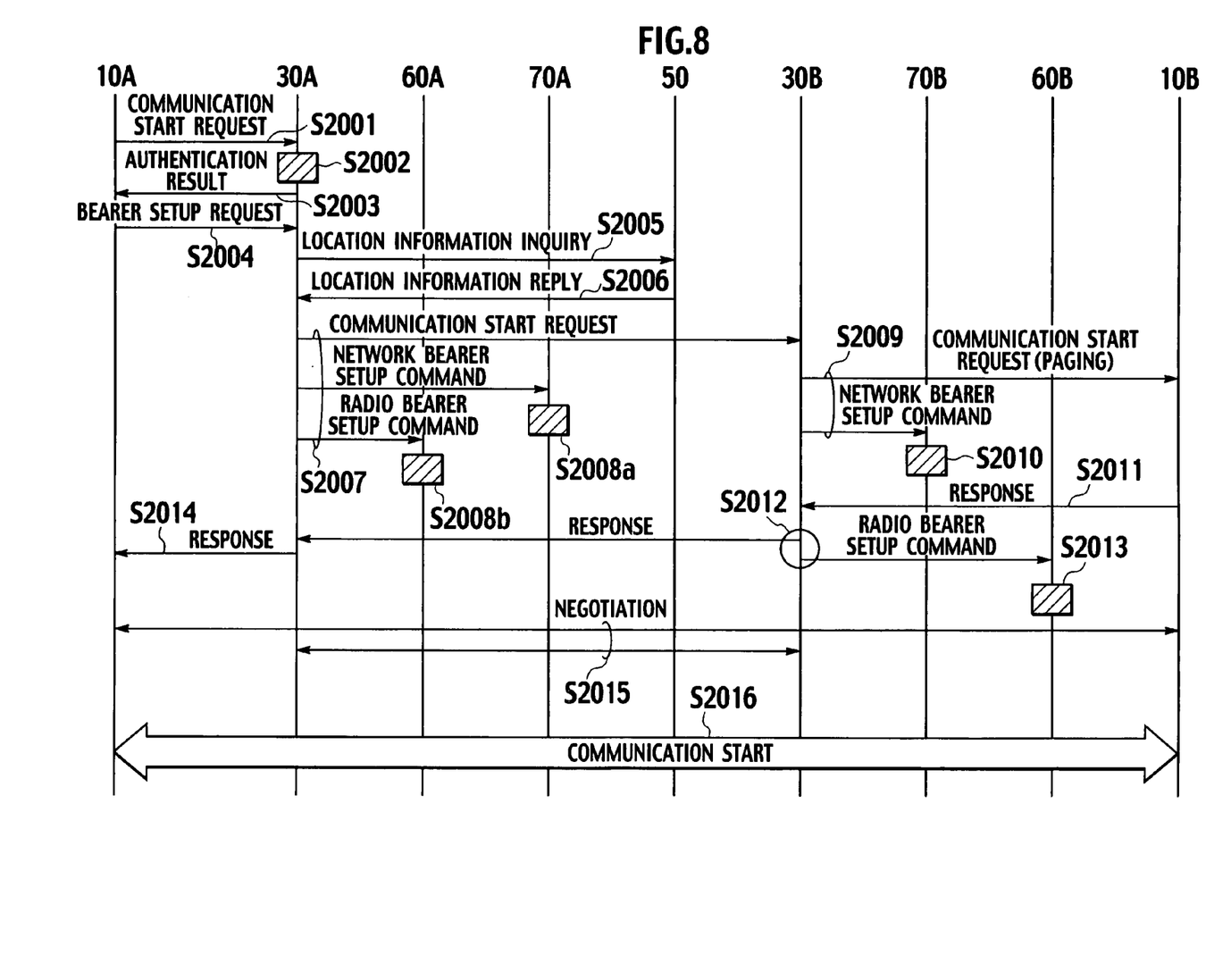
FIG. 8 is a sequence chart showing a mobile communication method according to the second embodiment of the present invention.
Figure 9:
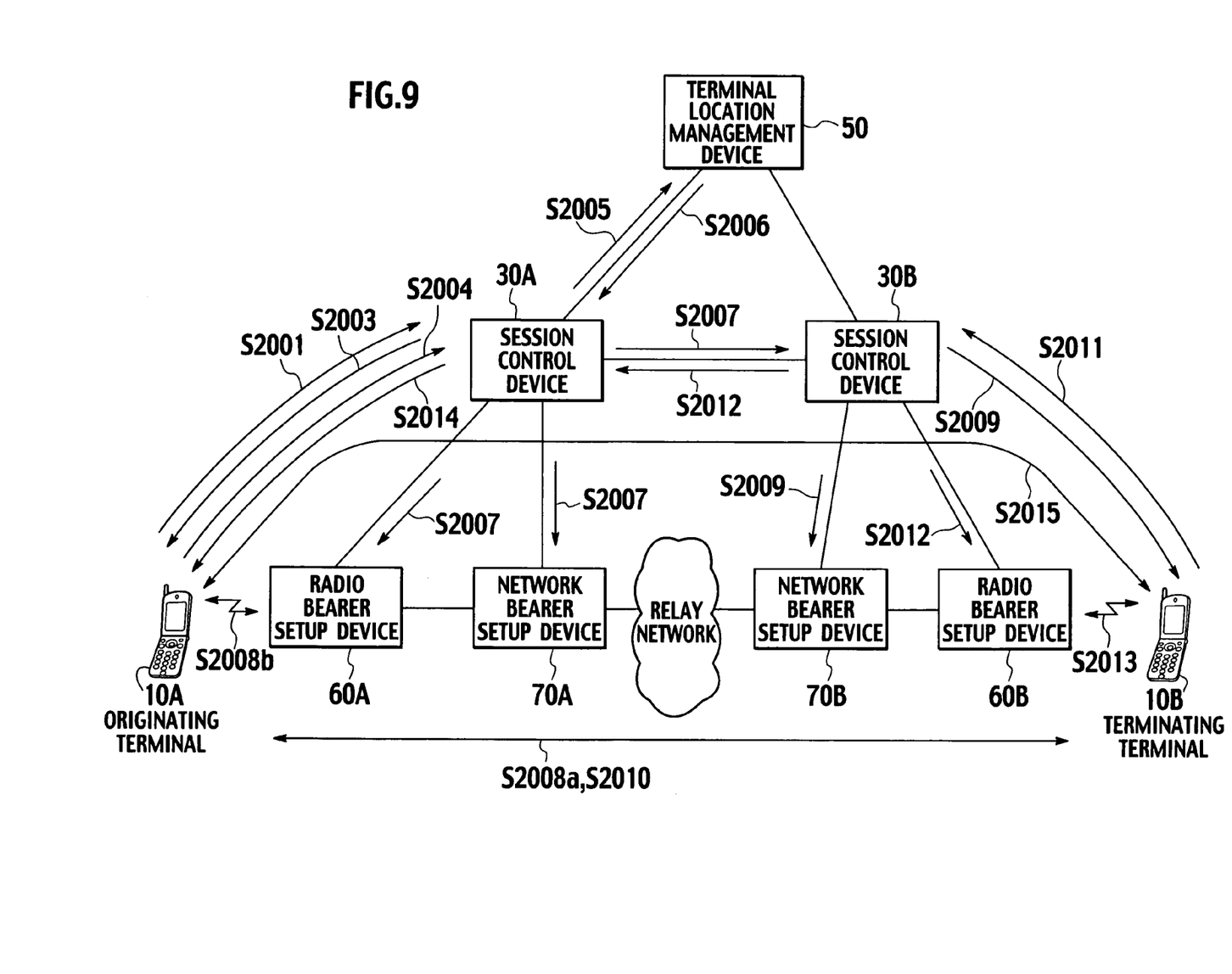
FIG. 9 is a view showing a flow of the mobile communication method according to the second embodiment of the present invention.

With reference to FIGS. 8 and 9, descriptions will be given of the operations of a mobile communication system according to a second embodiment of this present invention.

In Step S2001, an originating terminal 10A sends a communication start request (a call request) which requests to start communication with a terminating terminal 10B, to a session control device 30A controlling a location area of the originating terminal 10A.

The session control device 30A performs an authentication process for the originating terminal 10A in response to the received communication start request in Step S2002, and sends an authentication result to the originating terminal 1A in Step S2003.

In Step S2004, when the authentication result is affirmative, the originating terminal 10A sends to the session control device 30A a bearer setup request (a U-plane bearer setup request) which requests to set bearers for communications between the originating terminal 10A and the terminating terminal 10B.

In Step S2005, the session control device 30A makes an inquiry to a terminal location management device 50 about a location area of the terminating terminal 10B, and then in Step S2006, the location area of the terminating terminal 10B is obtained from the terminal location management device 50.

In Step S2007, the session control device 30A simultaneously performs a process of sending the communication start request for the terminating terminal 10B to a session control device 30B controlling the obtained location area of the terminating terminal 10B; a process of sending a network bearer setup command to command a network bearer setup device 70A to set a network bearer in a core network; and a process of sending a radio bearer setup command to command a radio bearer setup device 60A to set a radio bearer in a radio access network.

Note that the process of sending the radio bearer setup command to the radio bearer setup device 60A may be performed before Step S2005.

In Step S2008a, the network bearer setup device 70A sets a network bearer in a core network A used for communications between the originating terminal 10A and the terminating terminal 10B.

In Step S2008b, the radio bearer setup device 60A sets a radio bearer in a radio access network A used for communications between the originating terminal 10A and the terminating terminal 10B.

In Step S2009, the session control device 30B simultaneously performs a process of sending the communication start request (a calling signal, paging) for the terminating terminal 10B; and a process of sending a network bearer setup command to command a network bearer setup device 70B to set the network bearer in the core network.

In Step S2010, the network bearer setup device 70B sets a network bearer in a core network B used for communications between the originating terminal 10A and the terminating terminal 10B.

In Step S2011, the terminating terminal 10B sends a response to the received communication start request to the session control device 30B.

In Step S2012, the session control device 30B simultaneously performs a process of transferring the received response to the session control device 30A; and a process of sending a radio bearer setup command to command a radio bearer setup device 60B to set the radio bearer in the radio access network.

In Step S2013, the radio bearer setup device 60B sets a radio bearer in a radio access network B used for communications between the originating terminal 10A and the terminating terminal 10B.

In Step S2014, the session control device 30A transfers the received response to the originating terminal 10A.

In Step S2015, communication conditions including a communication quality, a communication speed and the like are negotiated between the originating terminal 10A, which has received the above-mentioned response, and the terminating terminal 10B, and between the session control devices 30A and 30B.

Here, when the negotiation result and the already set bearer (U-plane bearer) are compared and they are different, a bearer used for communications between the originating terminal 10A and the terminating terminal 10B are reset.

In Step S2016, the originating terminal 10A starts communications with the terminating terminal 10B by use of the set radio and network bearers.

It is possible to shorten the connection delay since bearer setups are conducted without waiting a negotiation for communication conditions to be conducted between an originating terminal and a terminating terminal by use of the present invention.

(Mobile Communication System According to the Third Embodiment of the Present Invention)

Figure 10:
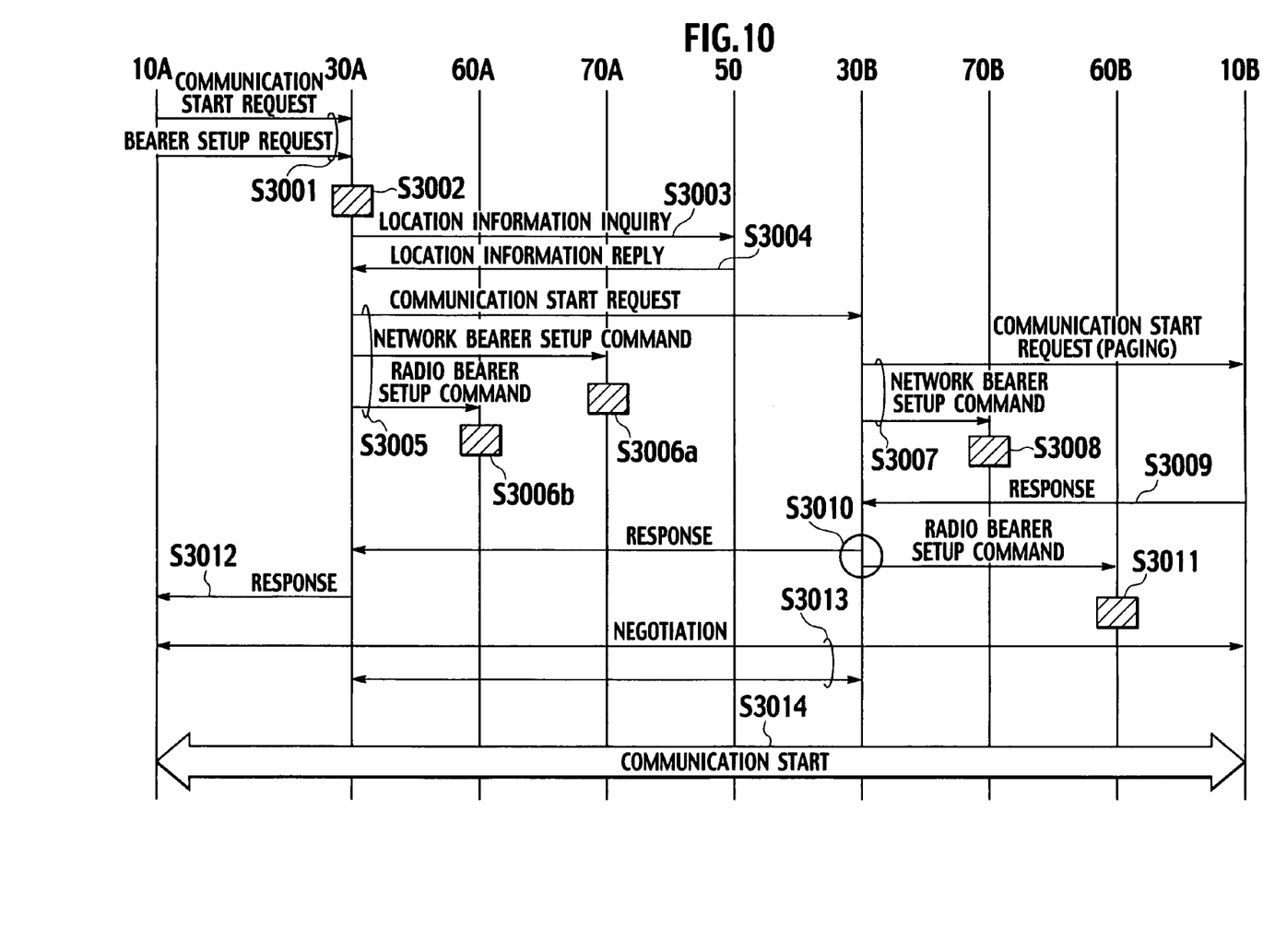
FIG. 10 is a sequence chart showing a mobile communication method according to the third embodiment of the present invention.
Figure 11:
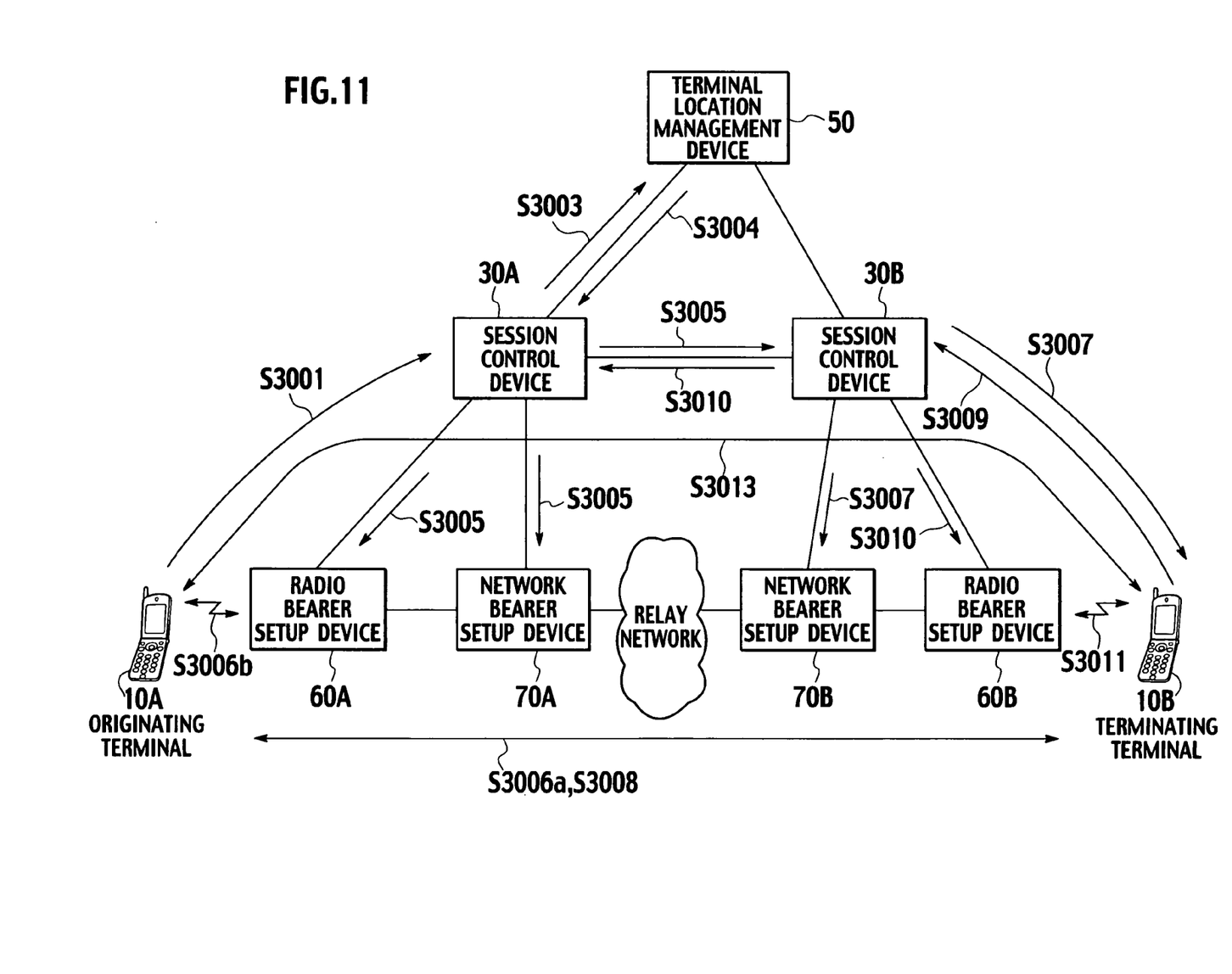
FIG. 11 is a view showing a flow of the mobile communication method according to the third embodiment of the present invention.

With reference to FIGS. 10 and 11, descriptions will be given of the operations of a mobile communication system according to a third embodiment of this present invention.

In Step S3001, an originating terminal 10A sends to a session control device 30A controlling a location area of the originating terminal 10A a communication start request (a call request) which requests to start communication with a terminating terminal 10B, in parallel with a bearer setup request (a U-plane bearer setup request) which requests to set bearers for communications between the originating terminal 10A and the terminating terminal 10B.

In Step S3002, the session control device 30A performs an authentication process for the originating terminal 10A in response to the received communication start request.

When the authentication result is affirmative, the session control device 30A makes an inquiry to a terminal location management device 50 about a location area of the terminating terminal 10B (location information) in Step S3003, and obtains the location area of the terminating terminal 10B from the terminal location management device 50 in Step S3004.

In Step S3005, the session control device 30A simultaneously performs a process of sending the communication start request for the terminating terminal 10B to a session control device 30B controlling the obtained location area of the terminating terminal 10B; a process of sending a network bearer setup command to command a network bearer setup device 70A to set a network bearer in a core network; and a process of sending a radio bearer setup command to command a radio bearer setup device 60A to set a radio bearer in a radio access network.

Note that the process of sending the radio bearer setup command to the radio bearer setup device 60A may be performed before Step S3003.

In Step S3006a, the network bearer setup device 70A sets a network bearer in a core network A used for communications between the originating terminal 10A and the terminating terminal 10B.

In Step S3006b, the radio bearer setup device 60A sets a radio bearer in a radio access network A used for communications between the originating terminal 10A and the terminating terminal 10B.

In Step S3007, the session control device 30B simultaneously performs a process of sending the communication start request (a calling signal, paging) for the terminating terminal 10B; and sending a network bearer setup command to command a network bearer setup device 70B to set the network bearer in the core network.

In Step S3008, the network bearer setup device 70B sets a network bearer in a core network B used for communications between the originating terminal 10A and the terminating terminal 10B.

In Step S3009, the terminating terminal 10B sends to the session control device 30B a response to the received communication start request.

In Step S3010, the session control device 30B simultaneously performs a process of transferring the received response to the session control device 30A; and a process of sending a radio bearer setup command to command a radio bearer setup device 60B to set the radio bearer in the radio network.

In Step S3011, the radio bearer setup device 60B sets a radio bearer in a radio access network B used for communications between the originating terminal 10A and the terminating terminal 10B.

In Step S3012, the session control device 30A transfers the received response to the originating terminal 10A.

In Step S3013, communication conditions including a communication quality, a communication speed and the like are negotiated between the originating terminal 10A, which has received the above-mentioned response, and the terminating terminal 10B, and between the session control devices 30A and 30B.

Here, when the negotiation result and the already set bearer (U-plane bearer) are compared and they are different, bearers used for communications between the originating terminal 10A and the terminating terminal 10B are reset.

In Step S3014, the originating terminal 10A starts communications with the terminating terminal 10B by use of the set radio and network bearers.

As described above, according to the present invention, it is possible to provide a mobile communication method, a mobile communication system, a session control device and an originating terminal, which can shorten the connection delay when starting communications between the originating terminal and a terminating terminal through a radio access network and a core network.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A mobile communication method for performing communications between an originating terminal and a terminating terminal through a first radio access network, a first core network, a second core network connected to the first core network through a relay network, and a second radio access network, comprising:
    sending a bearer setup request, in the originating terminal, to a first session control device controlling a location area of the originating terminal, the bearer setup request requesting to set a bearer for the communications between the originating terminal and the terminating terminal; and
    performing, in the first session control device, a first process of sending a communication start request for the terminating terminal to a second session control device controlling a location area of the terminating terminal in response to the bearer setup request, and a second process of commanding a bearer setup device for at least one of the first radio access network and the first core network to set the bearer, wherein
    in the performing step, the first process and the second process are performed in parallel and are performed prior to a negotiation about a communication condition between the originating terminal and the terminating terminal, and
    a result of the negotiation about the communication condition between the originating terminal and the terminating terminal is compared with a bearer condition set by the bearer setup device, and the first session control device commands a reset of the bearer when the result of the negotiation about the communication condition is different than the bearer condition.

2. The mobile communication method according to claim 1, wherein,
    in the performing step, the second session control device performs a third process of sending the communication start request for the terminating terminal, and a fourth process of commanding the bearer setup device for at least one of the second radio access network and the second core network to set the bearer,
    the third process and the fourth process are performed in parallel.

3. The mobile communication method according to claim 1, wherein,
    in the second process, the first session control device performs a process of commanding a bearer setup device for the first radio access network to set a radio bearer in the first radio access network in parallel with a process of commanding a bearer setup device for the first core network to set a network bearer in the first core network.

4. The mobile communication method according to claim 2, wherein,
    in the fourth process, the second session control device commands a bearer setup device for the second core network to set a network bearer in the second core network; and
    the method further comprising:
    performing a process of transferring a response to the first session control device in parallel with a process of commanding a bearer setup device for the second radio access network to set a radio bearer in the second radio access network, when the second session control device receives the response to the communication start request sent from the terminating terminal.

5. The mobile communication method according to claim 1, further comprising:
    setting the bearer in response to the bearer setup request, in a bearer setup device for the first and the second radio access network and a bearer setup device for the first and the second core network.

6. The mobile communication method according to claim 5, wherein,
    in the sending step, the originating terminal sends the bearer setup request in parallel with the communication start request for the terminating terminal, to the first session control device; and
    in the negotiating step, the originating terminal negotiates with the terminating terminal about the communication condition, when receiving a response to the communication start request sent from the terminating terminal.

7. A mobile communication system which performs communications between an originating terminal and a terminating terminal through a first radio access network, a first core network, a second core network connected to the first core network through a relay network, and a second radio access network, wherein,
    the originating terminal is configured to request a first session control device controlling a location area of the originating terminal to set a bearer for the communications between the originating and terminating terminals; and
    the first session control device is configured to perform a first process of sending a communication start request for the terminating terminal to a second session control device controlling a location area of the terminating terminal, and a second process of commanding a bearer setup device for at least one of the first radio access network and the first core network to set the bearer, wherein
    the first session control device performs the first process and the second process in parallel and prior to a negotiation about a communication condition between the originating terminal and the terminating terminal, and
    a result of the negotiation about the communication condition between the originating terminal and the terminating terminal is compared with a bearer condition set by the bearer setup device, and the first session control device commands a reset of the bearer when the result of the negotiation about the communication condition is different than the bearer condition.

8. A session control device which performs communications between an originating terminal and a terminating terminal through a first radio access network, a first core network, a second core network connected to the first core network through a relay network, and a second radio access network, comprising:

a transmission unit configured to send a communication start request for the terminating terminal to a session control device controlling a location area of the terminating terminal, and to send a bearer setup command to command a bearer setup device for at least one of the first radio access network and the first core network to set a bearer for the communications between the originating terminal and the terminating terminal in response to a communication start request sent from the originating terminal, wherein the transmission unit sends the communication start request and the bearer setup command in parallel and prior to a negotiation about a communication condition between the originating terminal and the terminating terminal, and a result of the negotiation about the communication condition between the originating terminal and the terminating terminal is compared with a bearer condition set by the bearer setup device, and the session control device commands a reset of the bearer when the result of the negotiation about the communication condition is different than the bearer condition.

9. A session control device which performs communications between an originating terminal and a terminating terminal through a first radio access network and a first core network and a second core network which is connected through a relay network to the first core network and a second radio access network, comprising:

a first transmission unit configured to send a communication start request for the terminating terminal, and to send a bearer setup command to command a bearer setup device for the second core network to set a network bearer in the second core network for the communications between the originating terminal and the terminating terminal, in response to a communication start request sent from a first session control device controlling a location area of the originating terminal; and a second transmission unit configured to perform a first process of transferring the response to the first session control device, and to perform a second process of commanding a bearer setup device for the second radio access network to set a radio bearer in the radio access network, when receiving a response to the communication start request sent from the terminating terminal, wherein the first transmission unit sends the communication start request and the bearer setup command in parallel, and the second transmission unit performs the first process and the second process in parallel and prior to a negotiation about a communication condition between the originating terminal and the terminating terminal, wherein a result of the negotiation about the communication condition between the originating terminal and the terminating terminal is compared with a bearer condition set by at least one of the bearer setup device for the second core network and the bearer setup device for the second radio access network, and the session control device commands a reset of at least a respective one of the radio bearer and the network bearer when the result of the negotiation about the communication condition is different than the bearer condition.

* * * * *